United States Patent
Beall et al.

(10) Patent No.: US 9,604,874 B2
(45) Date of Patent: Mar. 28, 2017

(54) PHOTOFORMABLE GLASS-CERAMICS COMPRISING NEPHELINE CRYSTAL PHASES

(71) Applicant: Corning Incorporated, Corning, NY (US)

(72) Inventors: George Halsey Beall, Big Flats, NY (US); Nicholas Francis Borrelli, Elmira, NY (US); Joseph Francis Schroeder, III, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/156,630

(22) Filed: May 17, 2016

(65) Prior Publication Data

US 2016/0340230 A1    Nov. 24, 2016

Related U.S. Application Data

(60) Provisional application No. 62/163,065, filed on May 18, 2015.

(51) Int. Cl.
| | | |
|---|---|---|
| C03C 10/10 | (2006.01) | |
| C03C 10/00 | (2006.01) | |
| C03C 3/112 | (2006.01) | |
| C03C 4/04 | (2006.01) | |
| C03C 14/00 | (2006.01) | |
| C03C 3/095 | (2006.01) | |
| C03C 3/097 | (2006.01) | |

(52) U.S. Cl.
CPC .......... *C03C 10/0018* (2013.01); *C03C 3/095* (2013.01); *C03C 3/097* (2013.01); *C03C 3/112* (2013.01); *C03C 4/04* (2013.01); *C03C 14/006* (2013.01); *C03C 2204/04* (2013.01)

(58) Field of Classification Search
CPC ...... C03C 10/18; C03C 14/006; C03C 21/002
See application file for complete search history.

(56) References Cited

U.S. PATENT DOCUMENTS

| | | | |
|---|---|---|---|
| 4,000,998 A | | 1/1977 | Rittler |
| 4,017,318 A | * | 4/1977 | Pierson .................... C03C 3/11 430/13 |
| 4,022,627 A | | 5/1977 | Tashiro et al. |
| 4,118,214 A | | 10/1978 | Wedding |
| 4,130,680 A | | 12/1978 | Ference et al. |
| 4,134,747 A | * | 1/1979 | Pierson .................. C03C 3/085 501/32 |

(Continued)

FOREIGN PATENT DOCUMENTS

DE    102005003595 A1    7/2006

OTHER PUBLICATIONS

Borrelli, "Glass Ceramics by Photosensitive Processes" International Hournal of Applied Glass Science, 6 (3) pp. 268-274 (2015).

(Continued)

*Primary Examiner* — Karl Group (57) ABSTRACT

Disclosed herein are glasses that are capable of forming nepheline crystal phases when exposed to light, photoformable glass-ceramics comprising at least one nepheline crystal phase, products containing such glasses and glass ceramics, and methods for making the same.

14 Claims, 4 Drawing Sheets

(56) References Cited

U.S. PATENT DOCUMENTS

| | | | |
|---|---|---|---|
| 4,310,595 A | | 1/1982 | Beall et al. |
| 4,979,975 A | * | 12/1990 | Borrelli .................. C03C 3/112 |
| | | | 501/13 |
| 5,019,538 A | | 5/1991 | Borrelli et al. |
| 9,359,243 B2 | | 6/2016 | Beall et al. |
| 2014/0238078 A1 | | 8/2014 | Boek et al. |

OTHER PUBLICATIONS

International Search Report and Written Opinion PCT/US2016/32835 Dated Aug. 11, 2016.

Duke, DA, MacDowell, JF and Karstetter, BR, Crystallization and Chemical Strengthening of Nepheline Glass-Ceramics, Am. Ceram. Soc., 50 (2), pp. 67-74, 1967.

Gomes de Borba CD, and Riella, H, Acquisitition and Characterization of Nepheline Glass-Ceramics, Revista de Cienda & Tecnologia, 15, pp. 67-74, Jun. 2000.

Hirose, M, Kobayashi, T and Maeda, K, Transparency and Mechanical Properties of Class-Ceramics Including Nepheline-Kalsilite Solid Solution, Reports Res. Lab. Asahi Glass Co.. Ltd., 55, pp. 1-7, 2005.

* cited by examiner

PHOTOFORMABLE GLASS-CERAMICS COMPRISING NEPHELINE CRYSTAL PHASES

This application claims the benefit of priority under 35 U.S.C. §119 of U.S. Provisional Application Ser. No. 62/163,065 filed on May 18, 2015 the content of which is relied upon and incorporated herein by reference in its entirety.

FIELD OF THE DISCLOSURE

The present disclosure generally relates to glasses that are capable of forming nepheline crystal phases when exposed to light, photoformable glass-ceramics comprising at least one nepheline crystal phase, products containing such glasses and glass ceramics, and methods for making the same.

BACKGROUND

The increasing demand for strong, dimensionally thin, and light products in consumer electronics has generated renewed interest in finding materials that can meet all these criteria. Where transparency is also desired, glasses have filled many of these criteria. In the case where opaque materials are desired, glass ceramics have been found to have at least some of the necessary attributes. For instance, opaque white and black glass-ceramics, such as white beta-spodumene glass-ceramics, are currently being used in smartphone housings—however, there is growing consumer demand not only for a larger variety of colors, but for the ability to pattern the structures as well.

Accordingly, it would be advantageous to be able to design glasses that can be selectively cerammed to provide patterned regions of opaque glass-ceramic. In addition, such glass/glass-ceramics should still be able to be chemically by ion exchange and/or thermally strengthened to allow for use in applications where strength is critical.

SUMMARY

The disclosure relates, in various embodiments, to photosensitive glasses, glass ceramics, and the forming of glass ceramics via photoactive processes.

A first aspect comprises a photosensitive glass composition comprising about:

| wt % | Component |
|---|---|
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO |

In some embodiments, the composition comprises about:

| wt % | Component |
|---|---|
| 40-50 | $SiO_2$ |
| 27-32 | $Al_2O_3$ |
| 15-25 | $Na_2O$ |
| >0-10 | $K_2O$ |
| >0-6 | $F^-$ |
| >0-0.2 | $CeO_2$ |
| >0-0.3 | $Sb_2O_3$ |
| >0-0.3 | Ag |
| 0-2 | $Br^-$ or $Cl^-$ or combinations thereof |
| >0-1.0 | SnO |

In some embodiments, the composition comprises about:

| wt % | Component |
|---|---|
| 40-50 | $SiO_2$ |
| 25-30 | $Al_2O_3$ |
| 15-20 | $Na_2O$ |
| >0-10 | $K_2O$ |
| 2-5 | $F^-$ |
| >0-0.2 | $CeO_2$ |
| >0-0.3 | $Sb_2O3$ |
| >0-0.3 | Ag |
| 0-0.5 | $Br^-$ or $Cl^-$ or combinations thereof |
| >0-0.8 | SnO |

In some embodiments, the composition is substantially free of $TiO_2$ and $ZrO_2$. In some embodiments, the composition is substantially free of lithium. In some embodiments, the composition further comprises >0 wt % $P_2O_5$.

A second aspect comprises a glass ceramic composition comprising about:

| wt % | Component |
|---|---|
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | wherein the glass ceramic comprises at least one nepheline phase.

In some embodiments, the glass ceramic composition comprises about:

| wt % | Component |
|---|---|
| 40-50 | $SiO_2$ |
| 27-32 | $Al_2O_3$ |
| 15-25 | $Na_2O$ |
| >0-10 | $K_2O$ |
| >0-6 | $F^-$ |
| >0-0.2 | $CeO_2$ |
| >0-0.3 | $Sb_2O_3$ |
| >0-0.3 | Ag |
| 0-2 | $Br^-$ or $Cl^-$ or combinations thereof |
| >0-1.0 | SnO |

In some embodiments, the glass ceramic composition comprises about:

| wt % | Component |
|---|---|
| 40-50 | $SiO_2$ |
| 25-30 | $Al_2O_3$ |

| wt % | Component |
| --- | --- |
| 15-20 | $Na_2O$ |
| >0-10 | $K_2O$ |
| 2-5 | $F^-$ |
| >0-0.2 | $CeO_2$ |
| >0-0.3 | $Sb_2O_3$ |
| >0-0.3 | Ag |
| 0-0.5 | $Br^-$ or $Cl^-$ or combinations thereof |
| >0-0.8 | SnO |

In some embodiments, the glass ceramic composition is substantially free of $TiO_2$ and $ZrO_2$. In some embodiments, the composition is substantially free of lithium. In some embodiments, the composition further comprises at least one lithium aluminosilicate phase or phosphate phase. In some embodiments, the composition further comprises >0 wt % $P_2O_5$. In some embodiments, the composition is thermally or chemically strengthened, for example the composition is chemically strengthened by ion exchange.

A third aspect comprises a glass-glass ceramic hybrid composition comprising:

a) a glass phase having a glass composition comprising about:

| wt % | Component |
| --- | --- |
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | and b) a glass ceramic phase having a glass ceramic composition comprising about:

| wt % | Component |
| --- | --- |
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | wherein the glass ceramic comprises at least one nepheline phase.

In some embodiments, the glass and glass ceramic phases each comprise about:

| wt % | Component |
| --- | --- |
| 40-50 | $SiO_2$ |
| 27-32 | $Al_2O_3$ |
| 15-25 | $Na_2O$ |
| >0-10 | $K_2O$ |
| >0-6 | $F^-$ |
| >0-0.2 | $CeO_2$ |
| >0-0.3 | $Sb_2O_3$ |
| >0-0.3 | Ag |
| 0-2 | $Br^-$ or $Cl^-$ or combinations thereof |
| >0-1.0 | SnO |

In some embodiments, the glass and glass ceramic phases each comprise about:

| wt % | Component |
| --- | --- |
| 40-50 | $SiO_2$ |
| 25-30 | $Al_2O_3$ |
| 15-20 | $Na_2O$ |
| >0-10 | $K_2O$ |
| 2-5 | $F^-$ |
| >0-0.2 | $CeO_2$ |
| >0-0.3 | $Sb_2O_3$ |
| >0-0.3 | Ag |
| 0-0.5 | $Br^-$ or $Cl^-$ or combinations thereof |
| >0-0.8 | SnO |

In some embodiments, the glass and glass ceramic phases are each substantially free of $TiO_2$ and $ZrO_2$. In some embodiments, the glass and glass ceramic phases are each substantially free of lithium. In some embodiments, the glass ceramic phase further comprises at least one lithium aluminosilicate phase or phosphate phase. In some embodiments, one or both of the glass and glass ceramic phases further comprise >0 wt % $P_2O_5$. In some embodiments, one or both of the glass and glass ceramic phases is thermally or chemically strengthened. In some embodiments, one or both of the glass and glass ceramic phases is chemically strengthened by ion exchange. In some embodiments, the glass phase and glass ceramic phase are ion exchanged to a different level. In some embodiments, the glass ceramic phase is translucent or opaque and the glass phase is transparent. In some embodiments, the glass ceramic phase is opaque and the glass phase is transparent.

A fourth aspect comprises a method of making an at least partially glass ceramic article, comprising:

a) exposing at least part of a photosensitive glass comprising about:

| wt % | Component |
| --- | --- |
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | to electromagnetic radiation of sufficient energy and for sufficient time to form one or more photo exposed regions; and b) thermally treating the photosensitive glass to a thermal treatment of sufficient temperature and time to ceram the photoexposed regions of the photosensitive glass, but insufficient to ceram unexposed regions of the photosensitive glass, wherein the thermally treated, photoexposed region comprises at least one nepheline phase.

In some embodiments, the photosensitive glass comprises about:

| wt % | Component |
|---|---|
| 40-50 | $SiO_2$ |
| 27-32 | $Al_2O_3$ |
| 15-25 | $Na_2O$ |
| >0-10 | $K_2O$ |
| >0-6 | $F^-$ |
| >0-0.2 | $CeO_2$ |
| >0-0.3 | $Sb_2O_3$ |
| >0-0.3 | Ag |
| 0-2 | $Br^-$ or $Cl^-$ or combinations thereof |
| >0-1.0 | SnO |

In some embodiments, the photosensitive glass comprises about:

| wt % | Component |
|---|---|
| 40-50 | $SiO_2$ |
| 25-30 | $Al_2O_3$ |
| 15-20 | $Na_2O$ |
| >0-10 | $K_2O$ |
| 2-5 | $F^-$ |
| >0-0.2 | $CeO_2$ |
| >0-0.3 | $Sb_2O3$ |
| >0-0.3 | Ag |
| 0-0.5 | $Br^-$ or $Cl^-$ or combinations thereof |
| >0-0.8 | SnO |

In some embodiments, the photosensitive glass is substantially free of $TiO_2$ and $ZrO_2$. In some embodiments, the photosensitive glass is substantially free of lithium. In some embodiments, the photoexposed regions of the photosensitive glass further comprise at least one lithium aluminosilicate phase or phosphate phase. In some embodiments, the electromagnetic radiation has a wavelength of less than 400 nm. In some embodiments, the exposure time is from about 1 minute to about 60 minutes. In some embodiments, the electromagnetic radiation has an excitation energy of from about 0.1 $J/cm^2$ to about 500 $J/cm^2$. In some embodiments, the electromagnetic radiation has an average intensity of from about 1 $mW/cm^2$ to about 10 $W/cm^2$. In some embodiments, the thermal treatment comprises heating the glass to a temperature from about 650° C. to about 720° C. In some embodiments, the thermal treatment is done for a time from about 1 hour to about 6 hours. In some embodiments, the method further comprises the step of thermally or chemically strengthened the at least partially photoexposed and thermally treated photosensitive glass. In some embodiments, at least partially photoexposed and thermally treated photosensitive glass is chemically strengthened by ion exchange.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

In the following detailed description, numerous specific details may be set forth in order to provide a thorough understanding of embodiments described herein. However, it will be clear to one skilled in the art when embodiments may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the embodiments, certain suitable methods and materials are described herein. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. More specifically, the example composition ranges given herein are considered part of the specification and further, are considered to provide example numerical range endpoints, equivalent in all respects to their specific inclusion in the text, and all combinations are specifically contemplated and disclosed. Further, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B." Exclusive "or" is designated herein by terms such as "either A or B" and "one of A or B," for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

Unless otherwise specified, the concentrations of all constituents recited herein are expressed in terms of weight percent (wt %).

Glasses and Glass Ceramics

As noted previously, it is highly desirable to obtain a highly crystalline nanophase glass-ceramic articles that exhibits improved mechanical strength and in particular one that is capable of being selectively cerammed. Further, it is advantageous if such articles exhibit such improved mechanical strength by exhibiting a high surface compressive stress that may be achieved or generated by exchanging potassium cations for sodium cations present in the glass-ceramic articles. Such materials would allow for the selective patterning of a crystalline phase onto an otherwise clear, crystal-free glass. Depending on the application, the crystalline phase could be from translucent to opaque and in some embodiments, even colored. Further, the glass and glass ceramic can have different mechanical and optical properties.

Previously, it has been shown that Ce/Ag-based photosensitive, fluorine-containing glasses (Corning Incorporated's FOTA-LITE™ and POLYCHROMATIC™) exhibit the property that when the glass is exposed to UV light followed by a thermal treatment, a nano crystalline NaF phase forms:

$$Ce^{+3} + h\nu \rightarrow e^- + Ce^{+3+}$$

$$Ag^{+1} + e^- \rightarrow Ag^0$$

$$nAg^0 \rightarrow (Ag^0)_n$$

$$mNa^+ + mF^- + \text{heat} + (Ag^0)_n \rightarrow (NaF)_m$$

It was found that this NaF phase can subsequently perform the function of a nucleating agent, leading to the formation of a nepheline phase thus rendering a photosensitively-produced, nepheline-containing glass. In addition, other photosensitive glasses have been formed where the photosensitive process produces a nanophase having metallic Au or Ag. However, even with the formation of a nepheline phase, none of these glasses comprised actual glass-ceramics, due, in part, to their composition and the fact that the volume fraction of the crystalline phase was less than 50%. The current disclosure provides the first example of a photosensitively produced glass-ceramic.

A first aspect comprises a photosensitive glass that, when exposed to electromagnetic radiation of a particular wavelength or wavelength region, is chemically changed in such a way as to form nucleating centers that lead to the heightened formation of one or more glass ceramic phases. One aspect comprises a photosensitive glass that preferentially forms a crystalline nepheline phase in regions of the glass exposed to radiation. In some embodiments, the photosensitive glass composition comprises, about:

| wt %   | Component   |
|--------|-------------|
| 38-52  | $SiO_2$     |
| 25-35  | $Al_2O_3$   |
| 10-25  | $Na_2O$     |
| 0-15   | $K_2O$      |
| >0-10  | Halogen     |
| >0-0.5 | $CeO_2$     |
| >0-0.5 | $Sb_2O_3$   |
| >0-0.5 | Ag          |
| >0-2   | $SnO_2$     |

In some embodiments, the photosensitive glass composition comprises, about:

| wt %    | Component                          |
|---------|------------------------------------|
| 40-50   | $SiO_2$                            |
| 27-32   | $Al_2O_3$                          |
| 15-25   | $Na_2O$                            |
| >0-10   | $K_2O$                             |
| >0-6    | $F^-$                              |
| >0-0.2  | $CeO_2$                            |
| >0-0.3  | $Sb_2O_3$                          |
| >0-0.3  | Ag                                 |
| 0-2     | $Br^-$ or $Cl^-$ or combinations thereof |
| >0-1.0  | $SnO_2$                            |

In some embodiments, the photosensitive glass composition comprises, about:

| wt %    | Component                          |
|---------|------------------------------------|
| 40-50   | $SiO_2$                            |
| 25-30   | $Al_2O_3$                          |
| 15-20   | $Na_2O$                            |
| >0-10   | $K_2O$                             |
| 2-5     | $F^-$                              |
| >0-0.2  | $CeO_2$                            |
| >0-0.3  | $Sb_2O3$                           |
| >0-0.3  | Ag                                 |
| 0-0.5   | $Br^-$ or $Cl^-$ or combinations thereof |
| >0-0.8  | $SnO_2$                            |

The composition of the photosensitive glass is critical to both the properties of the glass and the glass ceramic formed therefrom. For example, viscosity and mechanical performance are influenced by glass composition. $SiO_2$, an oxide involved in the formation of glass, can function to stabilize the networking structure of glasses and glass ceramics. The amount of $SiO_2$ may be limited to control melting temperature (200 poise temperature), as the melting temperature of high-$SiO_2$ glasses can be undesirably high. In some embodiments, the glass or glass ceramic composition comprises from about 38 to about 52 wt % $SiO_2$. In some embodiments, the glass or glass ceramic composition comprises from about 40 to about 50 wt % $SiO_2$. In some embodiments, the glass or glass ceramic composition comprises from 40 to about 46 wt % $SiO_2$. In some embodiments, the glass or glass ceramic composition can comprise from about 40 to about 50 wt %, about 40 to about 48 wt %, about 40 to about 46 wt %, about 40 to about 44 wt %, about 42 to about 50 wt %, about 42 to about 48 wt %, about 42 to about 46 wt %, about 42 to about 44 wt %, about 44 to about 50 wt %, about 44 to about 48 wt %, about 44 to about 46 wt %, about 46 to about 50 wt %, about 46 to about 48 wt %, or about 48 to about 50 wt % $SiO_2$. In some embodiments, the glass or glass ceramic composition comprises about 38, 39, 40, 41, 42, 43, 44, 45, 46, 47, 48, 49, 50, 51, or 52 wt % $SiO_2$.

$Al_2O_3$ may also provide stabilization to the network and is an essential constituent in the nepheline crystal phase. Additionally, the amount of $Al_2O_3$ may be tailored to control viscosity of the glass. However, if the amount of $Al_2O_3$ is too high, the viscosity of the melt is also generally increased. In some embodiments, the glass or glass ceramic composition can comprise from about 25 to about 35 wt % $Al_2O_3$. In some embodiments, the glass or glass ceramic composition can comprise from about 27 to about 32 wt % $Al_2O_3$. In some embodiments, the glass or glass ceramic composition can comprise from about 25 to about 35 wt %, about 25 to about 32 wt %, about 25 to about 30 wt %, about 27 to about 35 wt %, about 27 to about 32 wt %, about 27 to about 30 wt %, about 29 to about 35 wt %, or about 29 to about 32 wt % $Al_2O_3$. In some embodiments, the glass or glass ceramic composition can comprise about 25, 26, 27, 28, 29, 30, 31, 32, 33, 34, or 35 wt % $Al_2O_3$.

In some embodiments, the glass composition can comprise from about 10 to about 25 wt % $Na_2O$. In some embodiments, the glass or glass ceramic composition can comprise from about 15 to about 20 wt % $Na_2O$. In some embodiments, the glass or glass ceramic composition can comprise from about 10 to about 25 wt %, about 10 to about 22 wt %, about 10 to about 20 wt %, about 12 to about 25 wt %, about 12 to about 22 wt %, about 12 to about 20 wt %, about 15 to about 25 wt %, about 15 to about 22 wt %, or about 15 to about 20 wt % $Na_2O$. In some embodiments, the glass or glass ceramic composition can comprise about 10, 11, 12, 13, 14, 15, 16, 17, 18, 19, 20, 21, 22, 23, 24, or 25 wt % $Na_2O$.

In some embodiments, the glass composition can comprise from 0 to about 15 wt % $K_2O$. In some embodiments, the glass or glass ceramic composition can comprise from >0 to about 10 wt % $K_2O$. In some embodiments, the glass or glass ceramic composition can comprise from 0 to about 15 wt %, 0 to about 10 wt %, 0 to about 8 wt %, 0 to about 5 wt %, 0 to about 3 wt %, >0 to about 15 wt %, >0 to about 10 wt %, >0 to about 8 wt %, >0 to about 5 wt %, >0 to about 3 wt %, >0 to about 1 wt %, about 1 to about 15 wt %, about 1 to about 10 wt %, about 1 to about 8 wt %, about 1 to about 5 wt %, about 1 to about 3 wt %, about 3 to about 15 wt %, about 3 to about 10 wt %, about 3 to about 8 wt %, about 3 to about 5 wt %, about 5 to about 15 wt %, about 5 to about 10 wt %, about 5 to about 8 wt %, about 8 to about 15 wt %, about 8 to about 8 wt %, or about 10 to about 15 wt % $K_2O$. In some embodiments, the glass or glass ceramic comprises $K_2O$ in the amount of 0, >0, 1, 2, 3, 4, 4.5, 5, 6, 7, 8, 9, 10, 11, 12, 13, 14, or 15 wt %.

In some embodiments, the glass composition can comprise from greater than 0 to about 0.5 wt % $CeO_2$. In some embodiments, the glass or glass ceramic composition can comprise from greater than 0 to about 0.2 wt % $CeO_2$. In some embodiments, the glass composition can comprise from >0 to about 0.5 wt %, >0 to about 0.4 wt %, >0 to about 0.3 wt %, >0 to about 0.1 wt %, >0 to about 0.1 wt %, or >0 to about 0.05 wt % $CeO_2$. In some embodiments, the glass or glass ceramic composition can comprise about >0, 0.05, 0.1, 0.2, 0.3, 0.4, or 0.5 $CeO_2$.

In some embodiments, the glass composition can comprise from greater than 0 to about 0.5 wt % $Sb_2O_3$. In some embodiments, the glass or glass ceramic composition can comprise from greater than 0 to about 0.3 wt % $Sb_2O_3$. In some embodiments, the glass composition can comprise from >0 to about 0.5 wt %, >0 to about 0.4 wt %, >0 to about 0.3 wt %, >0 to about 0.1 wt %, >0 to about 0.1 wt %, >0 to about 0.05 wt %, or about 0.1 to about 0.3 $Sb_2O_3$. In some embodiments, the glass or glass ceramic composition can comprise about >0, 0.05, 0.1, 0.2, 0.3, 0.4, or 0.5 $Sb_2O_3$.

In some embodiments, the glass composition can comprise from greater than 0 to about 0.5 wt % Ag. While referenced as "Ag," the weight percentages described herein constitute any silver in the glass composition, no matter the ionic state, such as Ag, $Ag^+$, $Ag^{2+}$, and the like. In some embodiments, the glass or glass ceramic composition can comprise from greater than 0 to about 0.3 wt % Ag. In some embodiments, the glass composition can comprise from >0 to about 0.5 wt %, >0 to about 0.4 wt %, >0 to about 0.3 wt %, >0 to about 0.1 wt %, >0 to about 0.1 wt %, >0 to about 0.05 wt %, or about 0.001 to about 0.3 Ag. In some embodiments, the glass or glass ceramic composition can comprise about >0, 0.05, 0.1, 0.2, 0.3, 0.4, or 0.5 Ag.

The glass or glass ceramic composition can comprise from >0 to about 10 wt % total halogens, where halogens are selected from the group consisting of $Br^-$, $F^-$, $Cl^-$, and $I^-$, and combinations thereof. The halogens may be added to the composition as salts, such as NaF, NaCl, KCl, $MgBr_2$, $CaCl_2$, etc, however the halogen wt % is based on the halogen alone and not the salt with the counter ion. In some embodiments, the glass or glass ceramic composition can comprise from >0 to about 10 wt %, >0 to about 8 wt %, >0 to about 5 wt %, >0 to about 3 wt %, >0 to about 1 wt %, about 1 to about 10 wt %, about 1 to about 8 wt %, about 1 to about 5 wt %, about 1 to about 3 wt %, about 3 to about 10 wt %, about 3 to about 8 wt %, about 3 to about 5 wt %, about 5 to about 10 wt %, or about 5 to about 8 wt % of one or more halogens. In some embodiments, the glass or glass ceramic comprises one or more halogens in the amount of 0, >0, 1, 2, 3, 4, 4.5, 5, 6, 7, 8, 9, 10, 11, 12, 13, 14, or 15 wt %.

In some embodiments, the glass composition can comprise from greater than 0 to about 5 wt % fluorine. As used herein, fluorine describes fluorine atoms in any electronic configuration, for example, ionic or neutral. In some embodiments, the glass or glass ceramic composition can comprise from about 2 to about 5 wt % fluorine. In some embodiments, the glass composition can comprise from >0 to about 5 wt %, >0 to about 4 wt %, >0 to about 3 wt %, about 1 to about 5 wt %, about 1 to about 4 wt %, about 1 to about 3 wt %, about 2 to about 5 wt %, about 2 to about 4 wt %, or about 2 to about 3 wt % fluorine. In some embodiments, the glass or glass ceramic composition can comprise about >0, 1, 2, 3, 4, or 5 wt % fluorine.

In some embodiments, the glass composition can comprise from 0 to about 2 wt % bromine, chlorine, or combinations thereof. As used herein, bromine, chlorine, or combinations thereof describes bromine atoms, chlorine atoms, or combinations thereof in any electronic configuration, for example, ionic, radical, or neutral. In some embodiments, the glass or glass ceramic composition can comprise from 0 to about 1 wt % bromine, chlorine, or combinations thereof. In some embodiments, the glass composition can comprise from 0 to about 2 wt %, 0 to about 1 wt %, 0 to about 0.5 wt %, >0 to about 2 wt %, >0 to about 1 wt %, or >0 to about 0.5 wt % bromine, chlorine, or combinations thereof. In some embodiments, the glass or glass ceramic composition can comprise 0, >0, 1, 2, 3, 4, or 5 wt % bromine, chlorine, or combinations thereof.

The glass and glass ceramic compositions can comprise $P_2O_5$ as an optional component. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodiments can comprise from 0 to about 5 wt % $P_2O_5$. Other embodiments can comprise about >0 to about 4 wt % $P_2O_5$. Embodied compositions can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 0.5 to about 5 wt %, about 0.5 to about 4 wt %, about 0.5 to about 3 wt %, about 0.5 to about 2 wt %, about 0.5 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $P_2O_5$. In some embodiments, the glass or glass ceramic composition can comprise about 0, >0, 0.5, 1, 2, 3, 4, or 5 wt % $P_2O_5$.

Glasses and glass ceramics may advantageously be substantially free of $TiO_2$ and or $ZrO_2$. Nepheline-containing glass-ceramics are typically nucleated by using a $TiO_2$ nucleating agent, while $ZrO_2$ is often used as a nucleating agent as well. A significant amount of $TiO_2$ nucleating agent is typically required to produce internal nucleation in nepheline-containing glass-ceramics (e.g., from about 5-10 wt %), which is an amount sufficient to cause a yellow or amber color in the parent glass (from which the glass-ceramic article is formed) and in the resulting glass-ceramic article. Because of the composition and/or processes used herein to make the glass ceramics, the glasses and glass ceramics herein do not need $TiO_2$ to form the nepheline phase. By substantially free, it is meant that the glass/glass ceramic comprises less than about 0.1 mol % $TiO_2$ and/or $ZrO_2$.

The precursor glass and/or glass-ceramic may comprise, in certain embodiments, about from 0.05 mol % to about 5 mol % of at least one oxide chosen from transition metal oxides and rare earth oxides. For example, the precursor glass and/or glass-ceramic may comprise from about 0.05 mol % to about 3 mol % of at least one transition metal oxide and/or rare earth oxide, such as from about 0.1 mol % to about 2 mol %, or from about 0.5 mol % to about 1 mol %, including all ranges and subranges therebetween. As such, the precursor glass and/or glass-ceramic may comprise at least one oxide chosen from oxides of manganese, iron, cobalt, nickel, copper, vanadium, chromium, yttrium, lanthanum, and combinations thereof.

SnO can be a critical component of the compositions due in some embodiments to its ability to promoting and speeding up the photochemical processes. Therefore, compositions described herein may, in some embodiments, comprise from 0-2 wt % SnO, >0-2 SnO, >0-1 wt % SnO, >0-0.8 wt % SnO, or >0-0.5 wt % SnO.

Fining agents, such as $As_2O_5$, $SnO_2$, or $Sb_2O_3$, may also be present in the precursor glass and/or glass-ceramic according to various embodiments. If desired, such oxides are generally present in amounts less than about 1 mol %, for example, less than about 0.5 wt %. Other oxides including, but not limited to, $Cs_2O$, $Rb_2O$, $WO_3$, BaO, CaO, SrO, $Nb_2O_5$, $B_2O_3$, and $P_2O_5$, may also be included in the precursor glass and/or glass-ceramic in amounts up to about 5 mol %. In other embodiments, up to about 5 mol % of oxides chosen from $Bi_2O_3$, $Ta_2O_5$, $Ga_2O_3$, and PbO may be included in the precursor glass and/or glass-ceramic. According to certain embodiments, the precursor glass and/or glass-ceramic may be substantially free of lithium, for instance, substantially free of lithium oxide ($Li_2O$). While $Li_2O$ is often used in glass-ceramics that can be chemically strengthened by ion exchange, lithium ions may poison the ion exchange bath and may, in certain embodiments, be undesirable in the glass-ceramics disclosed herein. Accordingly, the precursor glass and/or glass-ceramic may be free of lithium or substantially free of lithium (e.g., less than about 0.01 mol %).

In some embodiments, glass and glass ceramic compositions may comprise additional components as coloring agents. In some embodiments, the glass or glass ceramic comprises from 0 to about 4 wt %, 0 to about 3 wt %, 0 to about 2 wt %, 0 to about 1 wt %, 0 to 0.5 wt %, >0 to about 4 wt %, >0 to about 3 wt %, >0 to about 2 wt %, >0 to about 1 wt %, >0 to 0.5 wt %, about 0.5 to about 4 wt %, about 0.5 to about 3 wt %, about 0.5 to about 2 wt %, about 0.5 to about 1 wt %, about 1 to about 4 wt %, about 1 to about 3 wt %, about 1 to about 2 wt %, about 2 to about 4 wt %, about 2 to about 3 wt %, or about 3 to about 4 wt % coloring agent. Coloring agents can include, but are not limited to, FeO, $Fe_2O_3$, SnO, $V_2O_5$, $Cr_2O_3$, $TiO_2$, $MnO_2$, NiO, ZnO, CuO, NiO, $Co_3O_4$, and combinations thereof.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials."

As used herein, a glass or glass ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass or glass ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 wt % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass can comprise from 0 to about 2 wt %, 0 to about 1 wt %, 0 to 0.5 wt %, 0 to 0.1 wt %, 0 to 0.05 wt %, or 0 to 0.01 wt % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, $As_2O_3$, $Sb_2O_3$ or combinations thereof as contaminants.

Glass Ceramics

Glass ceramics formed from the glasses described herein comprise nepheline ($Na_2O$—$K_2O$—$Al_2O_3$—$SiO_2$) crystal phases. The nepheline glass ceramics may be translucent or opaque and have different mechanical and optical properties from the glass. In the patterned composites nepheline glass ceramic/glass, one or both of the phases may have improved fracture toughness as controlled stresses can be developed between the exposed and unexposed regions due to different thermal expansion in the crystalline and glassy regions. In some embodiments, the glass and glass ceramic phases have different rates of $K^+$ to $Na^+$ ion exchange, which in some embodiments, can increase the overall strength and fracture toughness.

In some embodiments, the glass-ceramic articles comprise a phosphate phase, which may be present as a minor phase (in comparison to the nepheline phase) and an optional lithium aluminosilicate ("LAS") phase, which may be present as a minor phase (in comparison to the nepheline phase). In some instances, the phosphate crystals may be formed at lower temperatures than the nepheline crystals and, the phosphate crystals may nucleate the crystallization of nepheline on a fine scale (e.g., a scale of about tens of nanometers).

Glass-ceramics produced according to the present disclosure are opaque or translucent, i.e., not transparent. As used herein, the term "opaque" is intended to denote that the glass ceramic, when formed into a sheet having a thickness of approximately 1 mm, has a transmission of less than about 85% in the visible region of the spectrum (a wavelength range from about 400 nm to about 700 nm). For instance, an exemplary opaque glass-ceramic may have less than about 80% transmittance in the visible light range, such as less than about 75%, less than about 70%, less than about 65%, less than about 60%, less than about 55%, or less than about 50% transmittance, including all ranges and subranges therebetween. In certain embodiments, an exemplary opaque glass ceramic may have a transmittance of less than about 50% in the ultraviolet (UV) region (350-400 nm), such as less than about 45%, less than about 40%, less than about 35%, less than about 30%, less than about 25%, less than about 20%, less than about 15%, or less than about 10% transmittance, including all ranges and subranges therebetween. "Translucent," as used herein denotes the glass ceramic, when formed into a sheet having a thickness of approximately 1 mm, refers to the property of the glass ceramic to pass light through its structure, but wherein the light has a diffuse transmittance of greater than 10%, 20%, 30%, or 50%.

The glass-ceramics produced as disclosed herein may, in some embodiments, exhibit a wide variety of colors and, as opposed to art glazing or staining methods, the glass-ceramics produced according to the disclosed methods have through-body color, e.g., the colorant is distributed throughout the glass-ceramic, not just on the outer surface(s).

In one or more embodiments, the glass ceramics exhibit a fracture toughness of about 2.0 MPa·m$^{1/2}$ or greater, about 2.1 MPa·m$^{1/2}$ or greater, 2.2 MPa·m$^{1/2}$ or greater, 2.3 MPa·m$^{1/2}$ or greater, 2.4 MPa·m$^{1/2}$ or greater. In some embodiments, the fracture toughness is in the range from about 2.2 to about 3.5 MPa·m$^{1/2}$, from about 2.4 to about 3.5 MPa·m$^{1/2}$, from about 2.4 to about 3.4 MPa·m$^{1/2}$, from about 2.4 to about 3.3 MPa·m$^{1/2}$, from about 2.4 to about 3.2 MPa·m$^{1/2}$, from about 2.4 to about 3.1 MPa·m$^{1/2}$, from about 2.4 to about 3.0 MPa·m$^{1/2}$, from about 2.6 to about 3.5 MPa·m$^{1/2}$, from about 2.8 to about 3.5 MPa·m$^{1/2}$, from about 3.0 to about 3.5 MPa·m$^{1/2}$, from about 2.4 to about 2.6 MPa·m$^{1/2}$, from about 2.6 to about 3.0 MPa·m$^{1/2}$, or from about 3.2 to about 3.5 MPa·m$^{1/2}$. The fracture toughness values of the glass ceramics is due to the formation of a unique microstructure of interlocking blades (or rods) of lithium disilicate crystals and irregular crystals of β-spodumene. The fracture toughness may be measured using known methods in the art, for example, using a chevron notch, short bar, notched beam and the like, according to ASTM C1421-10, "Standard Test Methods for Determination of Fracture Toughness of Advanced Ceramics at Ambient Temperature," herein incorporated by reference in its entirety.

In one or more embodiments, the glass ceramics have high crack resistance by exhibiting a Vickers indentation crack initiation load in the range from about 15 kgf to about 30 kgf. In some embodiments, the glass ceramic exhibits a Vickers indentation crack initiation load in the range from about 16 to about 30 kgf, from about 18 to about 30 kgf, from about 20 to about 30 kgf, from about 22 to about 30 kgf, from about 15 to about 28 kgf, from about 15 to about 26 kgf, from about 15 to about 24 kgf, from about 15 to about 22 kgf, from about 15 to about 20 kgf, or from about 15 to about 18 kgf. Vickers indentation crack initiation load may be measured using ASTM C1326 and C1327 (and its progeny, all herein incorporated by reference) "Standard Test Methods for Vickers Indentation Hardness of Advanced Ceramics," ASTM International, Conshohocken, Pa., US, herein incorporated by reference in its entirety. In some embodiments, the glass ceramics exhibit such Vickers indentation crack initiation load values after being chemically strengthened via ion exchange. In more particular embodiments, the glass ceramic exhibits a Vickers indentation crack initiation load in the range from about 15 to about 20 kgf after ion exchanging in a NaNO$_3$ salt bath. As will be illustrated in the Examples, the high Vickers indentation crack initiation load values exhibited by the glass ceramic may be due to a densification (or compaction) mechanism when a Vickers indenter is applied to the glass ceramic.

Methods

Further disclosed herein are methods for making glass-ceramics comprising at least one nepheline crystal phase. The method comprises exposing a precursor glass to electromagnetic radiation with sufficient energy and for sufficient time to form nucleation centers, then subsequently heating the precursor glass at a temperature and for a time sufficient to convert the exposed precursor glass into a glass-ceramic, but wherein the temperature is low enough to avoid converting the unexposed precursor glass into a glass ceramic, where the precursor glass comprises about:

| wt % | Component |
|---|---|
| 38-52 | SiO$_2$ |
| 25-35 | Al$_2$O$_3$ |
| 10-25 | Na$_2$O |
| 0-15 | K$_2$O |
| >0-10 | Halogen |
| >0-0.5 | CeO$_2$ |
| >0-0.5 | Sb$_2$O$_3$ |
| >0-0.5 | Ag |
| >0-2 | SnO |

In some embodiments, the photosensitive precursor glass composition comprises, about:

| wt % | Component |
|---|---|
| 40-50 | SiO$_2$ |
| 27-32 | Al$_2$O$_3$ |
| 15-25 | Na$_2$O |
| >0-10 | K$_2$O |
| >0-6 | F$^-$ |
| >0-0.2 | CeO$_2$ |
| >0-0.3 | Sb$_2$O$_3$ |
| >0-0.3 | Ag |
| 0-2 | Br$^-$ or Cl$^-$ or combinations thereof |
| >0-1.0 | SnO |

In some embodiments, the photosensitive precursor glass composition comprises, about:

| wt % | Component |
|---|---|
| 40-50 | SiO$_2$ |
| 25-30 | Al$_2$O$_3$ |
| 15-20 | Na$_2$O |
| >0-10 | K$_2$O |
| 2-5 | F$^-$ |
| >0-0.2 | CeO$_2$ |
| >0-0.3 | Sb$_2$O3 |
| >0-0.3 | Ag |
| 0-0.5 | Br$^-$ or Cl$^-$ or combinations thereof |
| >0-0.8 | SnO |

According to the methods disclosed herein the precursor glass may be provided or the precursor glass may be produced by melting the appropriate batch materials. For instance, raw materials such as carbonates, nitrates, and/or hydroxides, can be used as the sources for the oxides present in the precursor glass, or the oxides themselves can be added to the batch. Non-limiting examples of suitable batch materials include silica (SiO$_2$); alumina, hydrated alumina, and aluminum hydroxide (Al$_2$O$_3$); sodium carbonate (Na$_2$O); potassium carbonate (K$_2$O); tin (IV) oxide (SnO$_2$); various transition metal oxides (e.g., MnO$_2$, Fe$_2$O$_3$, Co$_3$O$_4$, NiO, and CuO); and combinations thereof. Of course, other raw materials and oxides may be included in the batch composition, as desired.

The raw materials may be mixed together to form a batch composition which is then melted at a suitable temperature to form a precursor glass. By way of non-limiting example, the batch composition may be melted at a temperature ranging from about 1400° C. to about 1800° C., such as from about 1500° C. to about 1750° C., or from about 1600° C. to about 1650° C., including all ranges and subranges therebetween. The batch composition may be held at this temperature for a suitable time, for example, a time ranging from about 1 hour to about 20 hours, such as from about 2 hours to about 12 hours, from about 4 hours to about 10 hours, or from about 6 hours to 8 hours, including all ranges and subranges therebetween. In certain embodiments, the batch composition may be melted in a crucible, such as a platinum crucible, placed in a furnace, such as an electric furnace, although any other suitable melting process known in the art may be used According to various embodiments, after melting, the glass melt may be optionally drigaged, for instance, using a water bath. Drigaging breaks up the melt into small fragments, which can optionally be milled to a desired particle size. Alternatively, the drigage particles can be re-melted and poured to form a flattened glass cylinder or any other suitable shape. Optionally the glass melt can be annealed, for example, at a temperature ranging from about 500° C. to about 700° C., such as about 600° C. or about 650° C., including all ranges and subranges therebetween. Alternatively or additionally, the glass melt can be cooled to room temperature prior to further processing Once the precursor glass has been suitably formed and shaped, it can be selectively converted into a glass ceramic. The first step is to expose the precursor glass to electromagnetic radiation sufficient to form nucleation centers. Exposure may be done via, e.g., a Hg, or Hg/Xe lamps producing UV lines in the range 300-360 nm, or via a laser in the same wavelength range—within the range of the $Ce^{+3}$ photoexcitation spectrum. The level of excitation is proportional to the energy that is intensity multiplied by time—i.e., higher intensity exposures would require less exposure times. Light intensity and duration are within the purview of one of skill in the art.

Once the glass precursor has been photoexposed, the glass can be subjected to a thermal treatment. The typical thermal treatments ranges from about 600-700° C. for hold times of 2-10 hours, however, such ranges can be modified as necessary to obtain the desired product. Ideally, the temperature is optimized to allow for formation of the glass ceramic in the exposed regions, while the unexposed regions do not thermally produce the nepheline. It is within the ability of one skilled in the art to control the necessary processing parameters (e.g., ramp rate, temperature, time) as necessary for a particular application. According to various embodiments, the precursor glass may be heated to a temperature ranging from about 500° C. to about 700° C. and for a time ranging from about 1 hours to about 20 hours.

After heat treatment, the glass-ceramic may be further treated by any conventional method known in the art, for instance, cooling to room temperature, quenching, polishing, milling, etc.

The glass-ceramic may optionally be chemically strengthened by glazing or ion exchange. In the case of strengthening via ion exchange, an exemplary glass-ceramic may be immersed in a molten salt bath for a predetermined period of time. Ions within the glass sheet at or near the surface of the glass sheet are exchanged for larger metal ions from the salt bath. The incorporation of the larger ions into the glass can strengthen the sheet by creating a compressive stress in a near surface region. A corresponding tensile stress can be induced within a central region of the glass sheet to balance the compressive stress. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 700° C. and the predetermined time period may range from about 4 to about 8 hours, although other temperature and time combinations are envisioned. By way of a non-limiting example, the glass-ceramics can be submerged in a $KNO_3$ bath, for example, at about 450° C. for about 6 hours to obtain a K-enriched layer which imparts a surface compressive stress. Nepheline glass-ceramics have also been potassium ion exchanged at higher temperatures (e.g., about 600-750° C.) to create a kalsilite ($KAlSiO_4$) crystal layer on the surface which creates a high surface compressive stress. Alternatively, other monovalent ions such as $Ag^+$, $Tl^+$, $Cu^+$, and the like may be exchanged for monovalent ions.

The resulting compressive stress layer may have a depth (also referred to as a "depth of layer") of at least 20 μm on the surface of the glass and a maximum compressive stress of at least about 100 MPa, at least about 200 MPa, at least about 300 MPa or at least about 350 MPa. In other examples, embodiments may be ion exchanged by exposure to molten $KNO_3$ at a temperature of 410° C. for 8 hours to produce a compressive stress layer having a depth of layer of at least about 20 μm. In other embodiments the glasses are ion exchanged to achieve a central tension of at least 10 MPa. Chemically strengthened glass ceramics of some embodiments include a surface compressive stress layer is created that is created by the substitution of the Li contained in a glass surface with Na, which has a larger ionic radius.

In some embodiments, the glasses described herein can be manufactured into sheets via processes, including but not limited to, slot draw, float, rolling, and other sheet-forming processes known to those skilled in the art. Alternatively, glass compositions may be formed via float or rolling processes known in the art.

The glass formed from the glasses and glass ceramics described herein can be any thickness that is reasonably useful. Glass sheet and/or glass ceramic embodiments may have a thickness anywhere from about 0.8 mm to about 10 mm. Some embodiments have thickness of about 6 mm or less, about 5 mm or less, about 3 mm or less, about 1.0 mm or less, about 750 μm or less, about 500 μm or less, or about 250 μm or less. Some glass sheet embodiments may have thickness of from about 200 μm to about 5 mm, about 500 μm to about 5 mm, about 200 μm to about 4 mm, about 200 μm to about 2 mm, about 400 μm to about 5 mm, or about 400 μm to about 2 mm. In some embodiments, the thickness may be from about 3 mm to about 6 mm or from about 0.8 mm to about 3 mm.

The following Examples are intended to be non-restrictive and illustrative only, with the scope of the invention being defined by the claims.

Examples

Preparation of Glass-Ceramics

Glass-ceramics are prepared by batching and mixing raw materials ($SiO_2$, $Al_2O_3$, $Ce_2O_3$, $Sb_2O_3$, $Na_2O$, etc.) Each batch composition is melted in a Pt crucible in an electric furnace at 1650° C. for 4-6 hours and poured out onto a steel plate. The resulting glass is annealed at about 450-475° C.

The compositions (expressed as wt %) of the resulting precursor glasses are presented in Table I.

TABLE I

Glass/Glass Ceramic Composition

| Oxide | 1 | 2 | 3 | 4 | 5 | 6 | 7 | 8 | 9 |
|---|---|---|---|---|---|---|---|---|---|
| $SiO_2$ | 43.0 | 43.0 | 44.0 | 44.0 | 44.0 | 45.0 | 45.0 | 43.0 | 41.2 |
| $Al_2O_3$ | 29.6 | 29.6 | 29.1 | 29.1 | 29.1 | 28.6 | 28.6 | 27.4 | 26.2 |
| $Na_2O$ | 16.4 | 16.4 | 16.1 | 16.1 | 16.1 | 15.8 | 15.8 | 17.6 | 19.3 |
| $K_2O$ | 6.2 | 6.2 | 6.1 | 6.1 | 6.1 | 6.0 | 6.0 | 5.7 | 5.7 |
| ZnO | 1.6 | 1.6 | 1.6 | 1.6 | 1.6 | 1.5 | 1.5 | 1.4 | 1.4 |
| F– | 3.4 | 3.4 | 3.3 | 3.3 | 3.3 | 3.3 | 3.3 | 3.2 | 3.0 |
| Br– | 1.0 | 1.0 | 1.0 | 1.0 | 1.0 | 1.0 | 1.0 | 1.0 | 1.0 |
| $Ce_2O_3$ | 0.05 | 0.02 | 0.05 | 0.02 | 0.01 | 0.05 | 0.02 | 0.05 | 0.05 |
| $Sb_2O_3$ | 0.2 | 0.2 | 0.2 | 0.2 | 0.2 | 0.2 | 0.2 | 0.2 | 0.2 |
| SnO | 0.1 | 0.1 | 0.1 | 0.1 | 0.1 | 0.1 | 0.1 | 0.1 | 0.1 |
| Ag | 0.01 | 0.01 | 0.01 | 0.01 | 0.01 | 0.01 | 0.01 | 0.01 | 0.01 |
| $P_2O_5$ | 0 | 0 | 0 | 0 | 0 | 0 | 0 | 1.9 | 3.7 |

Figure 1:
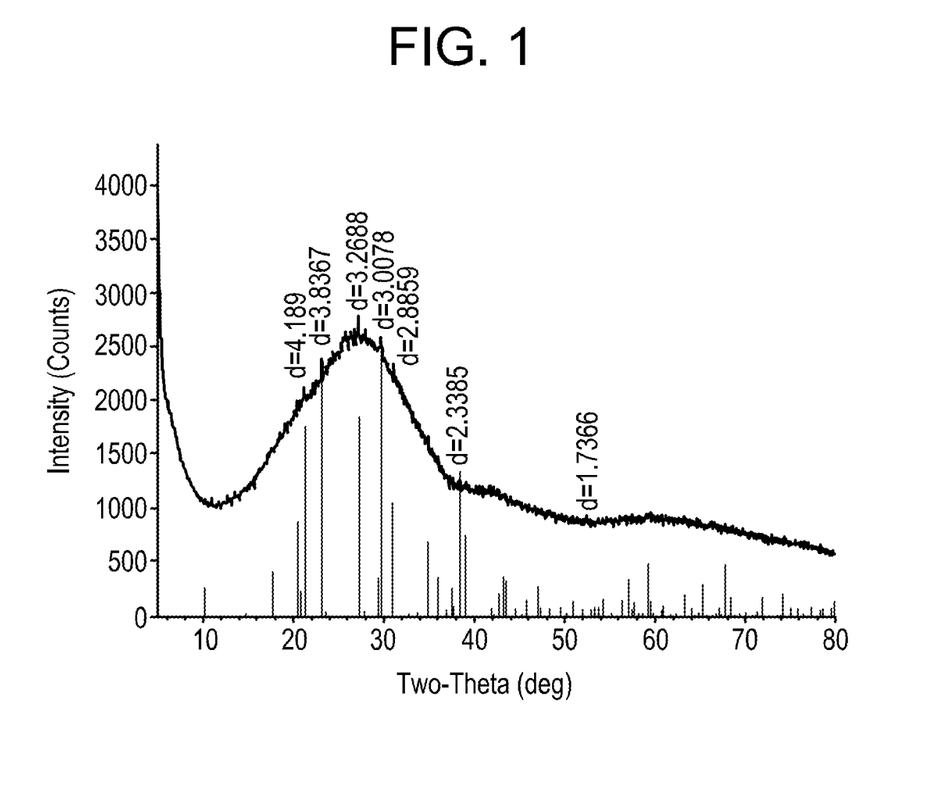
FIG. 1 is an XRD pattern of an embodied glass-ceramic that was not photoexposed prior to ceramming.
Figure 2:
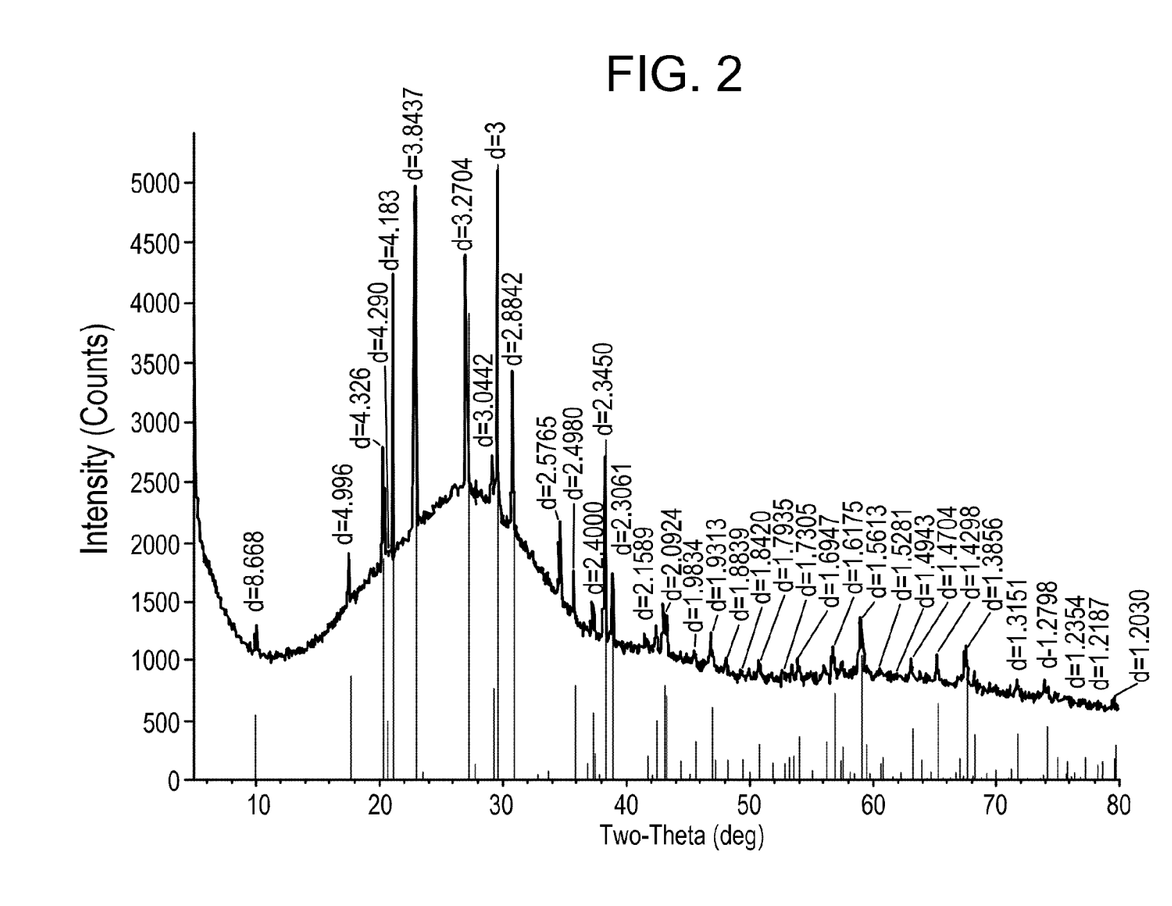
FIG. 2 is an XRD pattern of an embodied glass-ceramic that was photoexposed prior to ceramming.

The precursor glasses are converted to glass-ceramics via two processes: 1) thermal exposure without photoexposure; and 2) photoexposure to UV-light and subsequent thermal exposure. FIG. 1 shows an example X-ray diffraction (XRD) spectrum of glass ceramic composition 3 without photoexposure after a 2 hour thermal treatment at 690° C. The spectrum shows a predominantly glassy phase with very small amounts of nepheline present. Comparatively, FIG. 2 is an XRD spectrum of the same glass composition after UV exposure and subsequent thermal treatment at 690° C. for 2 hours. UV photoexposure was done via Hg, or Hg/Xe lamps producing UV lines in the range 300-360 nm. UV intensities for FIG. 2 (and in other experiments) are from about 5-10 $mW/cm^2$ with exposure times ranging from 5-60 min, producing an excitation range of ~3-36 $J/cm^2$.

Figure 3:
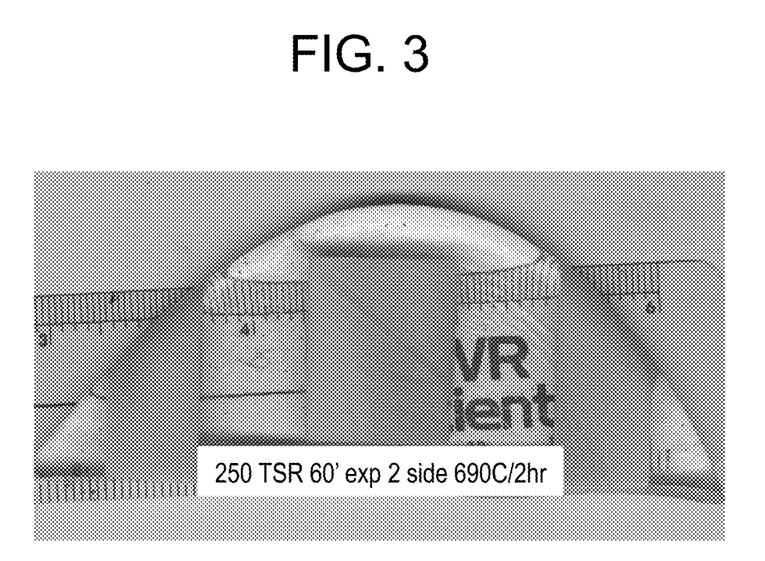
FIG. 3 is a picture of an embodied photopatterned glass/glass ceramic, where the opaque regions comprise nepheline nanophases.

The resulting glass-glass ceramic is shown in FIG. 3. The glass sample has opaque regions comprising nepheline nanophases that correspond to where the glass was photoexposed. In contrast, where the glass covered—i.e., not exposed to UV light—the glass is transparent and shows no sign of ceramic formation.

Figure 4A:
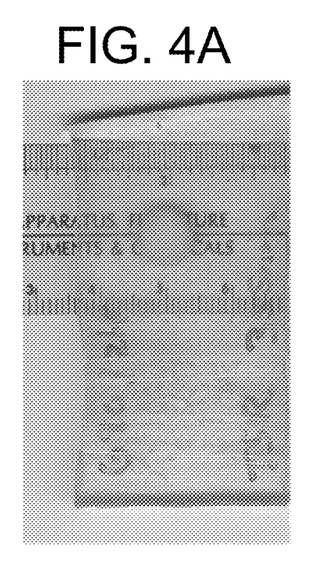
FIGS. 4A-C are pictures showing an embodied glass/glass ceramic that was exposed to different formation conditions.
Figure 4B:
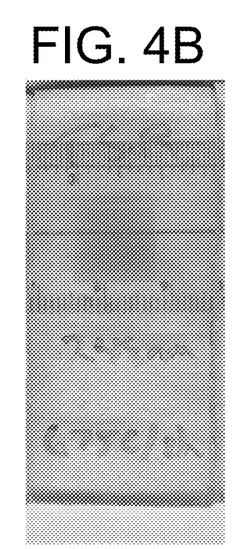
Figure 4C:
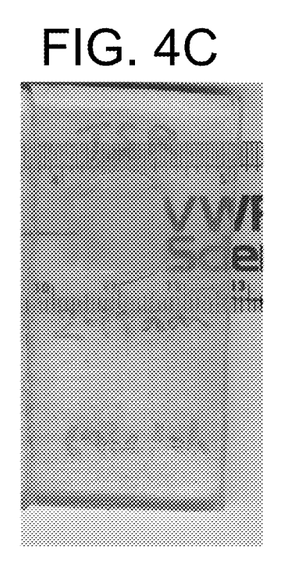

Alternatively, in some embodiments, a tripled YAG laser (355 nm) is used for photoexcitation with a typical intensity for a 10 Hz rep-rate of 2-3 W, yielding a 0.6 $J/cm^2$ per pulse. The exposure times were 1-10 minutes. In cases where the intent is to only produce the nepheline phase near the surface, a 248 nm excimer laser can be used (pulse energy of 0.1 $J/cm^2$) because of the depth of penetration is very shallow. FIGS. 4A-C shows examples where composition 3 was exposed to 355 nm light (360 $J/cm^2$) and then thermally treated at 690° C. for 2 hours ("FIG. 4A"); 248 nm light (60 $J/cm^2$) and thermal treatment at 675° C. for 2 hours ("FIG. 4B"); and 248 nm light (60 $J/cm^2$) and thermal treatment at 690° C. for 2 hours ("FIG. 4C"). As can be seen in the figure, the 355 nm light forms an opaque glass ceramic spot, FIG. 4A, while the 248 nm light at lower temps, FIG. 4B, creates a colored spot that retained most of its transparency. At higher thermal temperatures, the 248 nm region, FIG. 4C, becomes opaque as well.

What is claimed is:

1. A glass ceramic composition comprising about:

| wt % | Component |
|---|---|
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | wherein the glass ceramic comprises at least one nepheline phase.

2. The glass ceramic composition of claim 1, wherein the composition comprises about:

| wt % | Component |
|---|---|
| 40-50 | $SiO_2$ |
| 27-32 | $Al_2O_3$ |
| 15-25 | $Na_2O$ |
| >0-10 | $K_2O$ |
| >0-6 | F– |
| >0-0.2 | $CeO_2$ |
| >0-0.3 | $Sb_2O_3$ |
| >0-0.3 | Ag |
| 0-2 | Br– or Cl– or combinations thereof |
| >0-1.0 | SnO. |

3. The glass ceramic composition of claim 2, wherein the composition comprises about:

| wt % | Component |
|---|---|
| 40-50 | $SiO_2$ |
| 25-30 | $Al_2O_3$ |
| 15-20 | $Na_2O$ |
| >0-10 | $K_2O$ |
| 2-5 | F– |
| >0-0.2 | $CeO_2$ |
| >0-0.3 | $Sb_2O3$ |
| >0-0.3 | Ag |
| 0-0.5 | Br– or Cl– or combinations thereof |
| >0-0.8 | SnO. |

4. The glass ceramic composition of claim 1, wherein the composition further comprises at least one lithium aluminosilicate phase or phosphate phase.

5. The glass ceramic composition of claim 1, wherein the composition is thermally or chemically strengthened.

6. The glass ceramic composition of claim 5, wherein the composition is chemically strengthened by ion exchange.

7. A glass-glass ceramic hybrid composition comprising:
a) a glass phase having a composition comprising about:

| wt % | Component |
|---|---|
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | and b) a glass ceramic phase having a composition comprising about:

| wt % | Component |
|---|---|
| 38-52 | $SiO_2$ |
| 25-35 | $Al_2O_3$ |
| 10-25 | $Na_2O$ |
| 0-15 | $K_2O$ |
| >0-10 | Halogen |
| >0-0.5 | $CeO_2$ |
| >0-0.5 | $Sb_2O_3$ |
| >0-0.5 | Ag |
| >0-2 | SnO | wherein the glass ceramic comprises at least one nepheline phase.

8. The glass-glass ceramic hybrid composition of claim 7, wherein the glass and glass ceramic phases each comprise about:

| wt % | Component |
|---|---|
| 40-50 | $SiO_2$ |
| 27-32 | $Al_2O_3$ |
| 15-25 | $Na_2O$ |
| >0-10 | $K_2O$ |
| >0-6 | $F^-$ |
| >0-0.2 | $CeO_2$ |
| >0-0.3 | $Sb_2O_3$ |
| >0-0.3 | Ag |
| 0-2 | $Br^-$ or $Cl^-$ or combinations thereof |
| >0-1.0 | SnO. |

9. The glass-glass ceramic hybrid composition of claim 8, wherein the glass and glass ceramic phases each comprise about:

| wt % | Component |
|---|---|
| 40-50 | $SiO_2$ |
| 25-30 | $Al_2O_3$ |
| 15-20 | $Na_2O$ |
| >0-10 | $K_2O$ |
| 2-5 | $F^-$ |
| >0-0.2 | $CeO_2$ |
| >0-0.3 | $Sb_2O3$ |
| >0-0.3 | Ag |
| 0-0.5 | $Br^-$ or $Cl^-$ or combinations thereof |
| >0-0.8 | SnO. |

10. The glass-glass ceramic hybrid composition of claim 7, wherein the glass ceramic phase further comprises at least one lithium aluminosilicate phase or phosphate phase.

11. The glass-glass ceramic hybrid composition of claim 7, wherein one or both of the glass and glass ceramic phases is thermally or chemically strengthened.

12. The glass-glass ceramic hybrid composition of claim 11, wherein the glass phase and glass ceramic phase are ion exchanged to a different level.

13. The glass-glass ceramic hybrid composition of claim 7, wherein the glass ceramic phase is translucent or opaque and the glass phase is transparent.

14. The glass-glass ceramic hybrid composition of claim 7, wherein the glass ceramic phase is opaque and the glass phase is transparent.

* * * * *

UNITED STATES PATENT AND TRADEMARK OFFICE
CERTIFICATE OF CORRECTION

PATENT NO. : 9,604,874 B2
APPLICATION NO. : 15/156630
DATED : March 28, 2017
INVENTOR(S) : George Halsey Beall et al.

It is certified that error appears in the above-identified patent and that said Letters Patent is hereby corrected as shown below:

On the Title Page

In item (56), in Column 2, under "Other Publications", Line 2, delete "Hournal" and insert -- Journal --.

On the page 2, in Column 1, under "Other Publications", Line 6, delete "Acquisitition" and insert -- Acquisition --.

On the page 2, in Column 1, under "Other Publications", Line 10, delete "Class-Ceramics" and insert -- Glass-Ceramics --.

Signed and Sealed this
First Day of August, 2023

Katherine Kelly Vidal
*Director of the United States Patent and Trademark Office*